(12) United States Patent
Lam et al.

(10) Patent No.: US 7,895,603 B1
(45) Date of Patent: Feb. 22, 2011

(54) MECHANISM FOR ENABLING VIRTUAL METHOD DISPATCH STRUCTURES TO BE CREATED ON AN AS-NEEDED BASIS

(75) Inventors: Loi K. Lam, Mountain View, CA (US); Oleg A. Pliss, Santa Clara, CA (US); Nedim Fresko, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 1616 days.

(21) Appl. No.: 11/186,137

(22) Filed: Jul. 20, 2005

(51) Int. Cl.
*G06F 13/00* (2006.01)
*G06F 9/44* (2006.01)

(52) U.S. Cl. ...................... 719/316; 717/166
(58) Field of Classification Search .......... 717/161; 719/316
See application file for complete search history.

(56) References Cited

U.S. PATENT DOCUMENTS

| | | | |
|---|---|---|---|
| 6,810,519 B1 * | 10/2004 | Hicks | 717/166 |
| 2004/0015912 A1 * | 1/2004 | Bottomley | 717/148 |
| 2004/0143831 A1 * | 7/2004 | de Jong | 717/174 |
| 2004/0221272 A1 * | 11/2004 | Wu et al. | 717/128 |
| 2005/0216900 A1 * | 9/2005 | Shi et al. | 717/161 |
| 2005/0222979 A1 * | 10/2005 | Wu et al. | 707/3 |
| 2006/0059195 A1 * | 3/2006 | Hall et al. | 707/103 Y |

OTHER PUBLICATIONS

"Statement by Applicants," 5 pages (including two drawings).

* cited by examiner

*Primary Examiner*—Hyung S Sough
*Assistant Examiner*—Abdou K Seye
(74) *Attorney, Agent, or Firm*—Osha • Liang LLP

(57) ABSTRACT

A mechanism is disclosed for enabling virtual method dispatch structures (vstructures) to be created on an as-needed basis. When an object class is loaded, a vstructure specific to that object class is not created. Rather, the vstructure for that object class is created only if and when a virtual method of that object class is invoked. By creating vstructures on an as-needed basis, the number of vstructures created during the execution of a program is minimized. This in turn reduces the number of vstructures that need to be updated whenever a reference to a method is changed (for example, as a result of a garbage collection operation). To further optimize the efficiency of the vstructure update process, vstructure entries that point to the same method may be linked. That way, when the reference to a method is changed, all vstructures affected by that change can be quickly identified.

14 Claims, 9 Drawing Sheets

MECHANISM FOR ENABLING VIRTUAL METHOD DISPATCH STRUCTURES TO BE CREATED ON AN AS-NEEDED BASIS

BACKGROUND

In object oriented programming languages, such as Java, a subclass inherits the methods of its parent class. Thus, if class B is a subclass of class A, and class A has a method "foo", then class B also has a method foo. In most object oriented languages, it is also possible for a subclass to override the method implementation provided by its parent class. Thus, class B can provide a different implementation for method foo than that provided by class A. Because methods can be overridden, it is not possible at compile time to determine which implementation to invoke when method foo is called. If foo is called on an object that is an instance of class A, then the implementation provided by class A should be invoked, but if foo is called on an object that is an instance of class B, then the implementation provided by class B should be invoked. Because of this uncertainty, the implementation of foo to invoke needs to be determined at runtime. Methods, such as foo, that can be implemented by multiple classes, and the implementations for which need to be determined at runtime, are referred to as virtual methods.

The process of determining which implementation of a virtual method to invoke at runtime is known as virtual method dispatch. This process is typically carried out using virtual method dispatch tables (vtables). Usually, a vtable is created for each class. In the above example, class A has its own vtable and class B has its own vtable. Class A's vtable has an entry that points to the implementation for method foo provided by class A. Class B's vtable has an entry that points to the implementation for method foo provided by class B. At runtime, when method foo is called on an object, a determination is made as to the class of that object. If the object is of class A, then class A's vtable is used to perform the method dispatch, which results in class A's implementation for foo being invoked. On the other hand, if the object is of class B, then class B's vtable is used to perform the method dispatch, which results in class B's implementation for foo being invoked. In this manner, the proper implementation for foo is determined and invoked at runtime.

Typically, a vtable is created for a class at the time that the class is loaded. In some implementations, all classes within an application are loaded at the time the application is loaded. In other implementations, classes are loaded as they are referenced by the application. In either case, creating a vtable for a class at the time that the class is loaded can lead to the creation of many vtables (some applications can have hundreds or even thousands of classes loaded at a time). Because vtables often need to be updatable, vtables are often stored in RAM, a very expensive type of storage. The more vtables that need to be created, the more RAM that is required, and the higher the cost of a device or system.

Another problem associated with having a large number of vtables is that of performance degradation. In many implementations (e.g. Java implementations), the information in vtables is updated fairly regularly. For example, in a system that implements garbage collection, a set of code may be moved from one location of the memory heap to another as part of the garbage collection operation. When this happens, all of the vtables that contain a pointer to that set of code need to be updated to point to the new location. If there is a large number vtables, and if the movement of the set of code affects a large number of these vtables, then the updating of the vtables could take a very long time. This in turn could have a significant adverse impact on the overall performance of the system.

SUMMARY

It has been observed by Applicants that, in many implementations, even those in which a large number of classes are loaded at a time, relatively few classes actually have their virtual methods invoked during operation. This in turn means that relatively few vtables are actually used. If a vtable is created for each class at the time the class is loaded, it can lead to the unnecessary creation of many vtables that are not used.

In light of this observation, one embodiment of the present invention provides a mechanism for creating virtual method dispatch structures (vstructures) on an as-needed basis. As used herein, the term vstructure refers broadly to any data structure that stores information for enabling virtual method dispatch to be carried out. A vstructure may be a vtable or any other type of data structure. According to this embodiment of the present invention, a vstructure specific to a particular class is not created at the time the particular class is loaded. Instead, the vstructure for that particular class is created at the time one of the virtual method(s) of that particular class is first invoked. Since a vstructure is truly needed only when a virtual method is invoked, creating the vstructure for the particular class at that point is quite timely. If none of the virtual method (s) of the particular class are ever invoked, then no vstructure will be created for that particular class. By creating a vstructure only as needed rather than at the time of loading a class, the number of vstructures that are created can be significantly reduced. This reduction in vstructures will lead to reduced RAM requirements, and hence, lower cost, and will facilitate faster updating of vstructures, which will lead to improved performance.

In one embodiment, to further enhance performance, vstructures with entries that point to the same set of code may be linked. That way, when the set of code is moved (or the pointer has to be updated for whatever reason), all affected vstructures can be quickly identified. This and other enhancements may be made to further improve performance.

DETAILED DESCRIPTION OF EMBODIMENT(S)

Overview of Sample System

Figure 1:
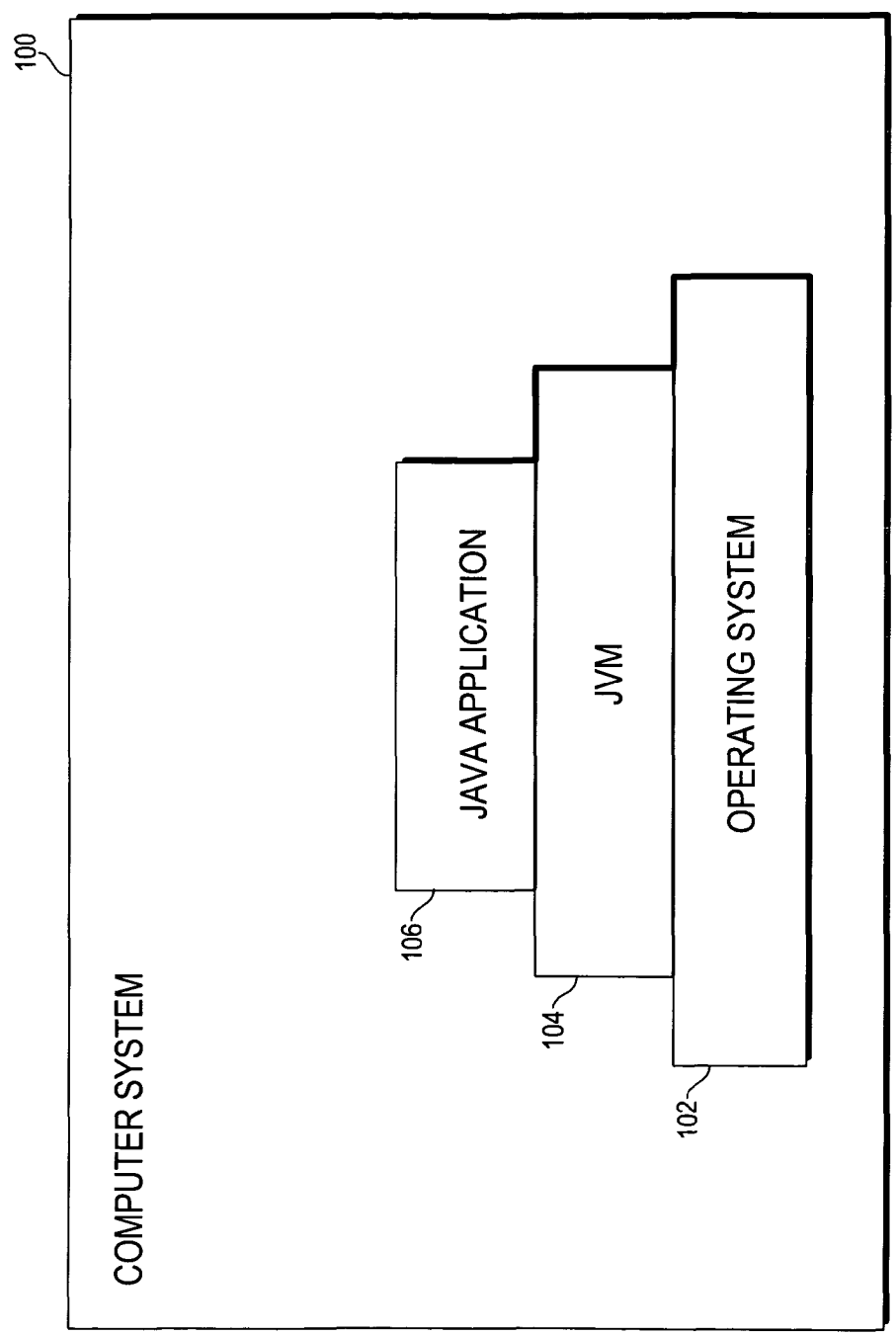
FIG. 1 is a functional block diagram of a sample system in which one embodiment of the present invention may be implemented.

With reference to FIG. 1, there is shown a functional block diagram of a sample system in which one embodiment of the present invention may be implemented. For the sake of illustration, an embodiment of the present invention will be described in the context of a Java-based implementation. However, it should be noted that the invention is not so limited. Rather, the concepts taught herein may be generally applied to any type of implementation in which virtual method dispatch is performed.

As shown in FIG. 1, the sample computer system 100 comprises an operating system 102, a Java virtual machine (JVM) 104, and one or more Java applications 106 (for the sake of simplicity, only one Java application is shown). The operating system 102, which may be, for example, Solaris, Unix, Linux, Windows, DOS, MacOs, etc., provides all of the low-level functionalities typically provided by an operating system. The JVM 104 runs on top of the operating system 102, and provides the Java platform for supporting the execution of Java applications 106. In addition to many other functions, the JVM 104 is responsible for loading the Java object classes that make up the Java application 106, initializing the object classes and creating the data structures (including the vstructures) needed to perform virtual method dispatch, managing the virtual method dispatch process, allocating memory, performing garbage collection to deallocate memory, and updating the vstructures as needed. In one embodiment, it is the JVM 104 that implements, at least in large part, the process of creating class-specific vstructures on an as-needed basis. The operation of the JVM 104 will be described in greater detail in the sections to follow.

Introduction to Data Structures Used in Virtual Method Dispatch

To illustrate how virtual method dispatch may be carried out in accordance with one embodiment of the present invention, reference will be made to FIG. 2, which shows some of the data structures involved in the virtual method dispatch process. For the sake of illustration, the data structures shown in FIG. 2 are for an object class B.

Figure 2:
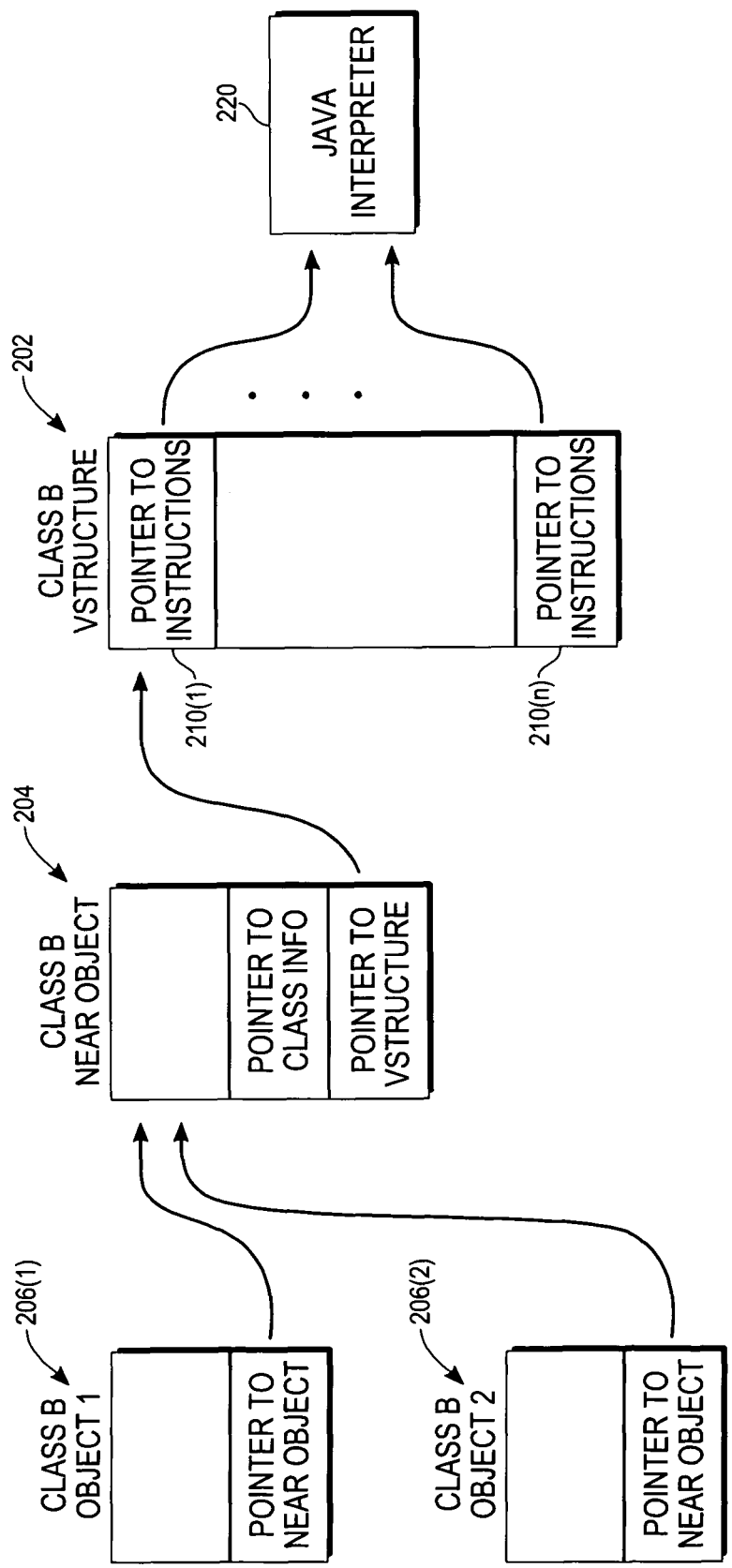
FIG. 2 shows some of the data structures involved in the virtual method dispatch process, in accordance with one embodiment of the present invention.

As shown in FIG. 2, class B has a vstructure 202 and a near object data structure 204 associated therewith. The near object data structure 204 (hereinafter, near object) comprises a pointer to the vstructure 202. It also comprises a pointer to a set of class information (which may be embodied in one or more other data structures, not shown) for class B. The class information contains all of the specific details pertaining to class B, such as how many virtual methods are supported by class B, the Java source code for the virtual methods, etc. Data structures 202 and 204 are referenced by all object instances of class B. For example, as shown in FIG. 2, there are two object data structures 206(1), 206(2) associated with two object instances of class B. Object data structure 206(1) is associated with object 1, and object data structure 206(2) is associated with object 2. Both of these data structures 206 contain a pointer that points to near object 204; thus, both object instances of class B reference near object 204, and hence, can reference vstructure 202 using the vstructure pointer. At this point, it should be noted that while the use of near object 204 is convenient, it is not required. If so desired, the information contained in the near object 204 may be incorporated into each of the object data structures 206, and the near object 204 may be removed. In such a case, the object data structures 206 would reference the vstructure 202 directly. This and other modifications are within the scope of the present invention.

In one embodiment, the vstructure 202, which may be a vtable or any other type of data structure, comprises a plurality of entries 210. Each entry corresponds to one of the virtual methods of class B; thus, if class B has an n number of virtual methods, then vstructure 202 has an n number of entries 210. Each entry 210 contains a pointer to a set of instructions that is to be executed when the corresponding virtual method of class B is invoked. Thus, entry 210(1) points to the instructions to be invoked when virtual method 1 is invoked, entry 210(n) points to the instructions to be invoked when virtual method n is invoked, and so forth. In one embodiment, when the vstructure 202 is first created, all of the entries 210 point to the Java interpreter 220, which is a part of the JVM 104. Since Java source code is interpretive code, when a virtual method is invoked, it is the Java interpreter 220 that is executed. In turn, the Java interpreter 220 obtains the Java source code for the invoked virtual method, interprets it (e.g. converts it to Java byte codes), and executes it.

To illustrate how the data structures shown in FIG. 2 may be used by the JVM 104 to carry out virtual method dispatch, it will be assumed that the first virtual method of class B is invoked on object 1. Upon detecting this invocation, the JVM 104 accesses the object data structure 206(1) associated with object 1, and obtains therefrom the pointer to the near object 204. Using this pointer, the JVM 104 accesses the near object 204, and obtains therefrom the pointer to the vstructure 202. Using this pointer, the JVM 104 accesses the first entry 206(1) of the vstructure 202 (the entry that corresponds to the first virtual method of class B) and obtains a pointer therefrom. Currently, this pointer points to the Java interpreter 220; thus, in response to the invocation of the first virtual method of class B, the JVM 104 causes the Java interpreter 220 to be executed. In one embodiment, in response to being executed, the Java interpreter 220 accesses the object data structure 206(1) associated with object 1, and obtains therefrom the pointer to the near object 204. The Java interpreter 220 then accesses the near object 204 and obtains therefrom the pointer to the class information. Following that pointer, the Java interpreter accesses the class information for class B, obtains the Java source code for the first virtual method of class B, and executes that code. In this manner, the first virtual method is invoked and executed.

Figure 3:
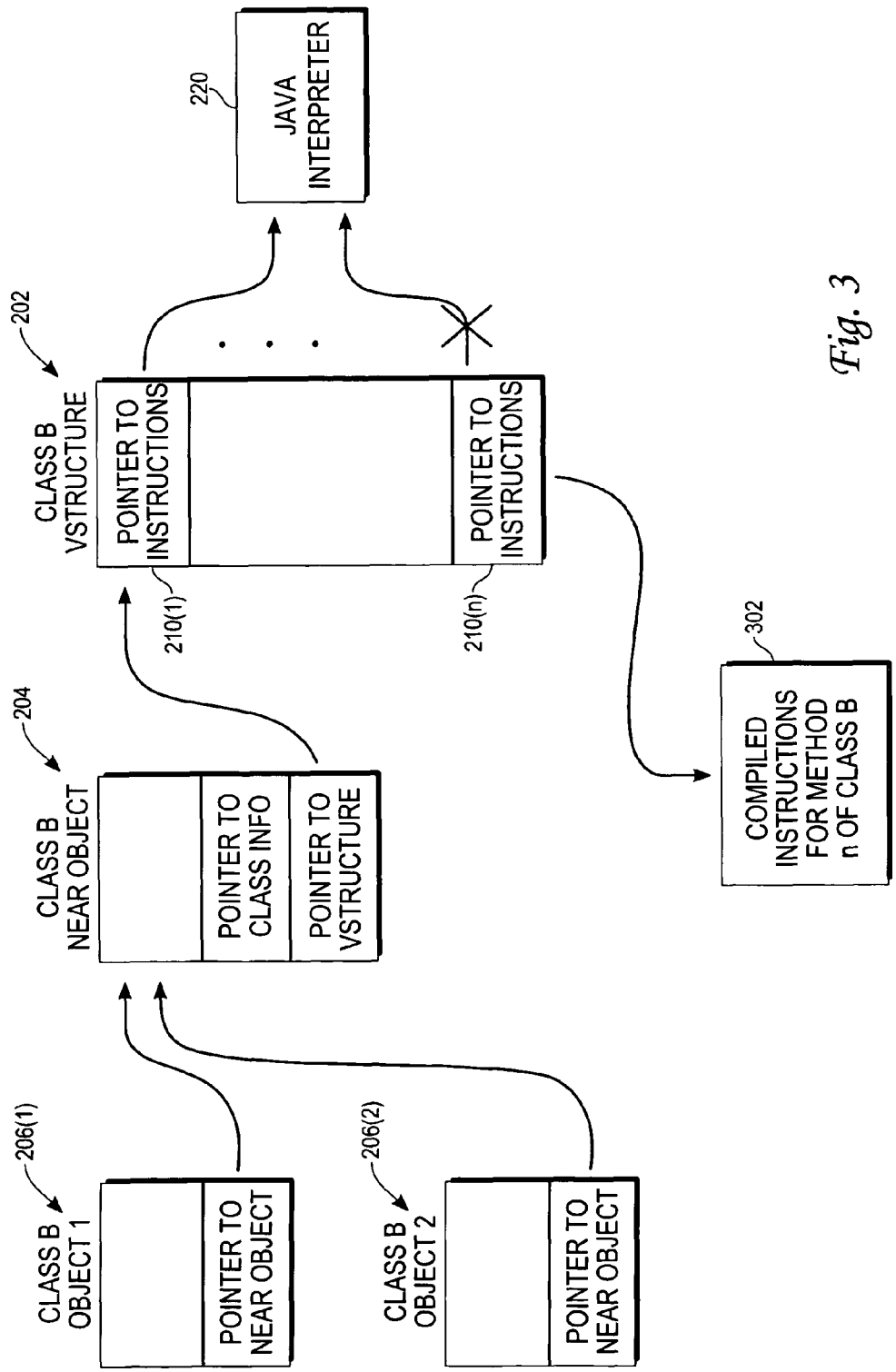
FIG. 3 shows the changes made to the data structures of FIG. 2 when a Java method is compiled, in accordance with one embodiment of the present invention.

In Java, after a virtual method is invoked a certain number of times, the JVM 104 may decide to compile that method into machine executable code rather than leaving it as Java source code. This type of compilation is referred to as just-in-time or JIT compilation. Because compiled code can be executed much faster than interpreted source code, compiling a virtual method enables it to be executed faster. When a virtual method is compiled, the entry in a vstructure corresponding to that method needs to be updated. Specifically, the entry should be updated to point to the compiled instructions for the method rather than the Java interpreter 220. This can be seen in the example of FIG. 3, where JVM 104 has decided to compile the nth virtual method of class B. After the virtual method is compiled, the pointer in the nth entry 210(n) of vstructure 202 is updated to point to the compiled instructions 302 instead of the Java interpreter 220. That way, the next time the nth method of class B is invoked, the compiled instructions 302 will be executed instead of the Java Interpreter 220.

Compiling a method is one of the events that may cause a vstructure 202 to be updated. Another is that of moving an already compiled method. For example, if the set of compiled instructions 302 is moved from its current location to another location (for example, as a result of a garbage collection operation), then entry 210(n) should be updated to point to the new location instead of the current location.

In some circumstances, the compilation of a virtual method or the moving of a set of compiled instructions may affect more than one vstructure. For example, if a class implements a method, and that class and method are inherited by many subclasses, then all of those subclasses will have vstructures that contain an entry corresponding to that method. If that method is compiled, or if the compiled instructions for that method are moved, then all of the vstructures associated with the class and its subclasses need to be updated. In one embodiment, to accommodate efficient updating of multiple vstructures, each entry 210 in a vstructure 202 may include a link to another vstructure. These links allow a linked list of affected vstructures to be formed. With this list, it is possible to quickly identify all of the vstructures that are affected by an update to a method. This aspect of a vstructure will be described in greater detail in a later section.

Class/Object Loading and Initialization

As noted previously, a vtable is typically created for an object class at the time the object class is loaded. However, in one embodiment of the present invention, this is not done. Instead, a vstructure is created for a class only if and when a virtual method of that class is actually invoked. To accommodate such an implementation, a new methodology for loading and initializing object classes is provided, in accordance with one embodiment of the present invention. This new methodology is shown by example in FIG. 4.

Suppose that during the execution of a Java application 106, JVM 104 loads and initializes a plurality of object classes. When the JVM 104 loads these object classes, it creates a near object 404 for each class (for example, it creates near object 404(1) for class B, near object 404(x) for class X, etc.). In each near object 404, the JVM 104 stores a pointer or reference to one or more data structures (not shown) that contain the class information for the class with which the near object 404 is associated. The JVM 104 also stores into the near object 404 a pointer or reference to a vstructure 402. This vstructure 402, however, is not a vstructure created specifically for the object class with which the near object 404 is associated. Rather, the vstructure 402 is a shared vstructure that is referenced by all of the newly created near objects 404. Thus, rather than creating a class-specific vstructure for each object class as each class is loaded, the JVM 104 causes each object class (and more specifically, the near object 404 of each object class) to reference the same shared vstructure 402.

In one embodiment, the shared vstructure 402 comprises a y number of entries 410, where y is equal to the largest number of virtual methods supported by any one object class. For example, if object class H supports twelve virtual methods, and twelve is the most virtual methods supported by any object class, then y is twelve. In one embodiment, each and every entry of the shared vstructure 402 points to the same set of structure creation instructions 420. When executed, this set of instructions 420 causes a class-specific vstructure to be created for a class, as will be described in greater detail in a later section. For purposes of the present invention, the shared vstructure 402 may be created at any time, including at the time the first set of object classes is loaded, or beforehand.

In addition to the near objects 404, the JVM 104 may also create one or more object data structures 406 corresponding to one or more object instances of the classes for which the near objects 404 were created. The JVM 104 stores in each object data structure 406 a pointer or reference to the near object 404 that corresponds to the object class of which the object is an instance.

Figure 4:
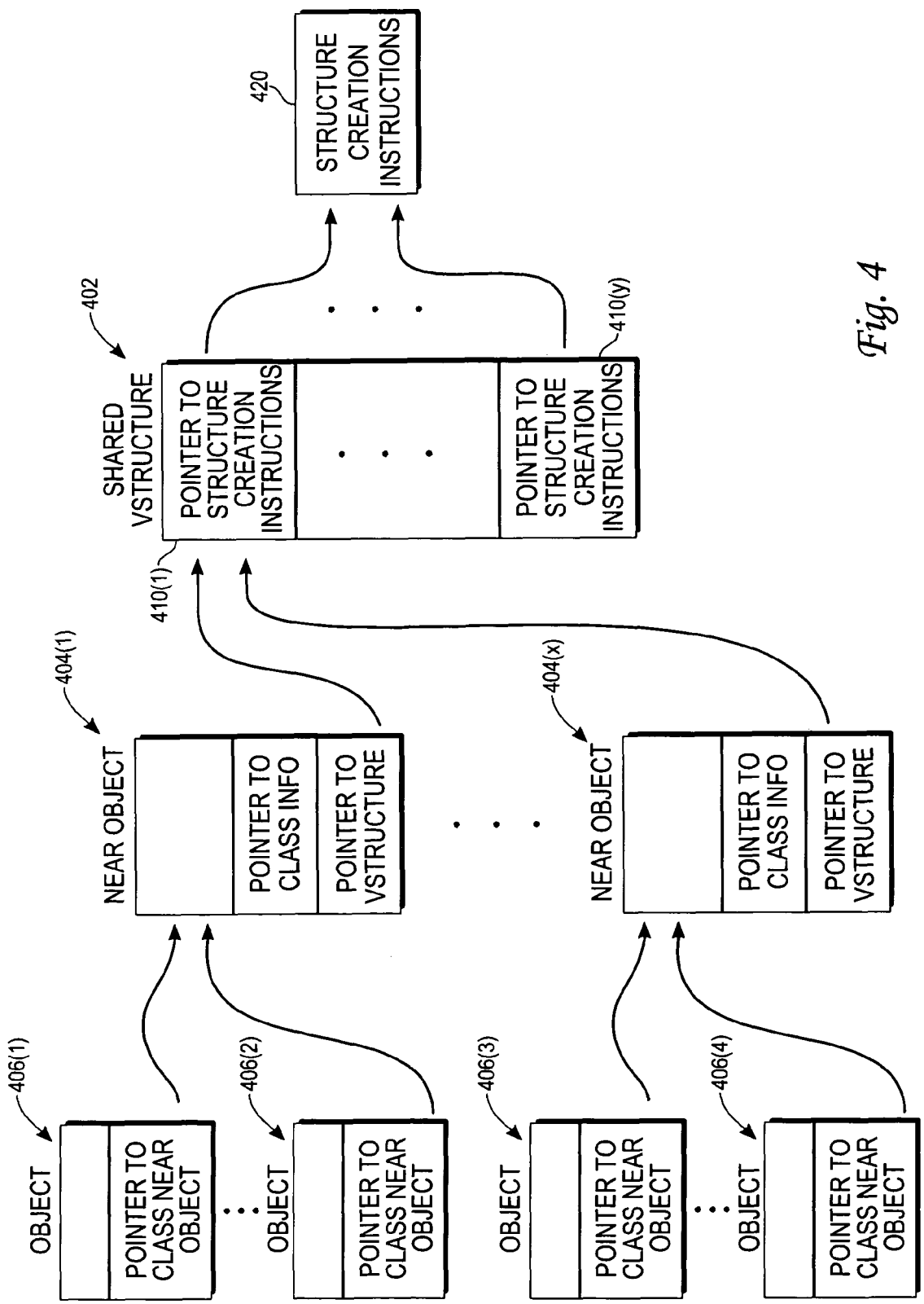
FIG. 4 shows some of the data structures used in initializing a plurality of object classes, in accordance with one embodiment of the present invention.

In the manner described, each object class is loaded and initialized. The data structures associated with the object classes remain as shown in FIG. 4 until a virtual method of one of the classes is invoked.

Creation of Class Specific Vstructure

To illustrate how a class-specific vstructure may be created, reference will now be made to an example. Suppose that the near object 404(1) is the near object for a class B, and that the object data structure 406(1) corresponds to an object instance of class B. Suppose further that the first virtual method of that object instance (and hence, the first virtual method of class B) is invoked. Upon detecting this virtual method invocation, the JVM 104 accesses the object data structure 406(1) associated with the object instance on which the virtual method was invoked. From this object data structure 406(1), the JVM 104 obtains the pointer to the near object 404(1), and follows that pointer to access the near object 404(1). From the near object 404(1), the JVM 104 obtains and follows the pointer to the shared vstructure 402. Once at the shared vstructure 402, the JVM 104 accesses the entry that corresponds to the virtual method being invoked. Since in this example the first virtual method of class B is being invoked, the JVM 104 accesses the first entry 410(1) of the shared vstructure 402. The pointer in that entry points to the structure creation instructions 420; thus, the JVM 104 causes those instructions 420 to be executed in response to the virtual method invocation.

Figure 5:
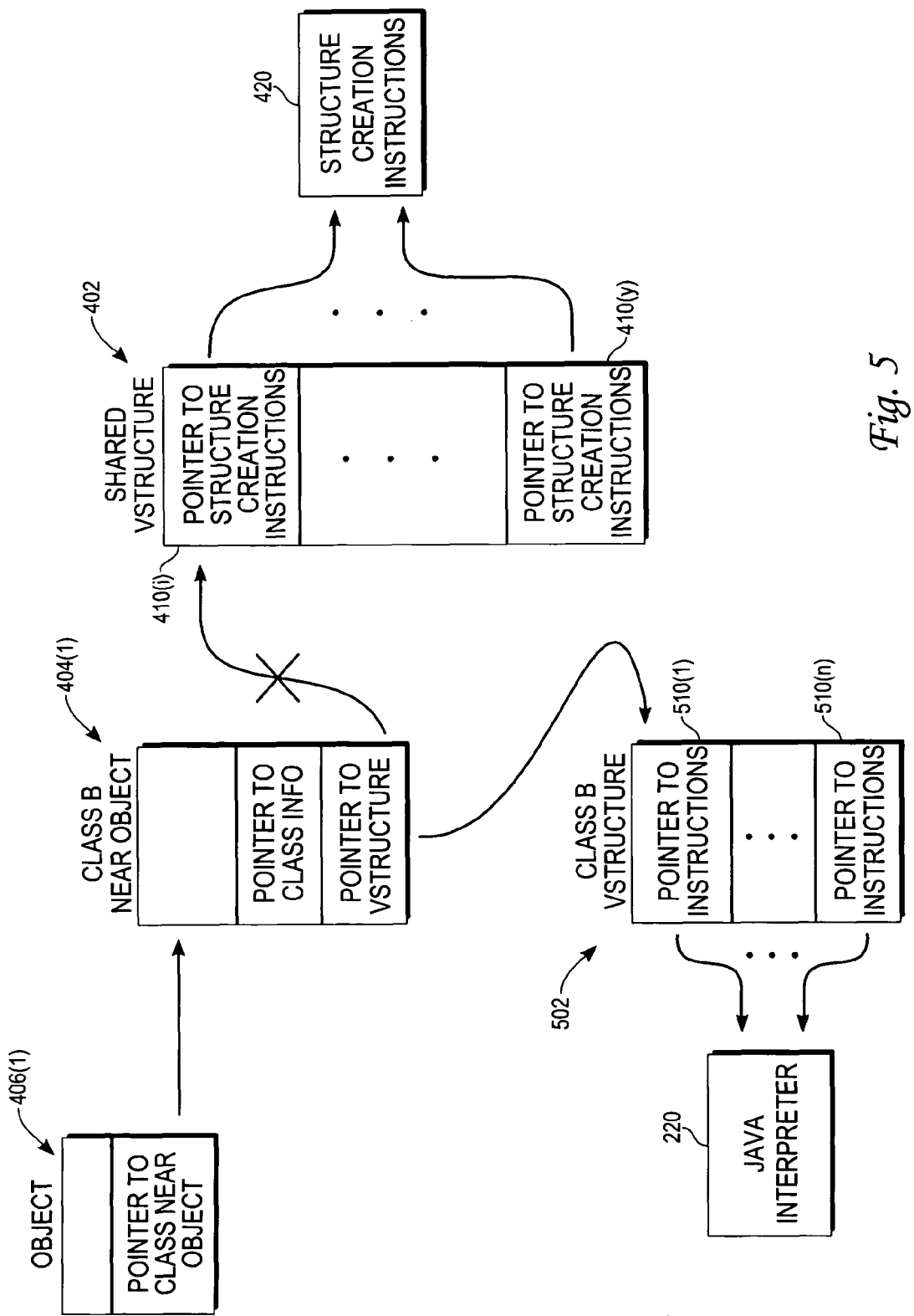
FIG. 5 shows some of the data structures that are changed and created when a class-specific vstructure is created, in accordance with one embodiment of the present invention.

When executed, the structure creation instructions 420 create a vstructure for the class on which the virtual method was invoked, which in the current example is class B. In one embodiment, the vstructure is created as follows. Initially, the structure creation instructions 420 access the object data structure 406(1) of the object instance on which the virtual method was invoked. It follows the pointer in that object data structure 406(1) to the near object 404(1), and then follows the pointer in the near object 404(1) to the class information data structure(s) (not shown) for class B. From the class information, the structure creation instructions 420 determine how many virtual methods are supported by class B. It then creates a vstructure having that many entries (see FIG. 5). In the current example, it will be assumed that class B has n virtual methods; thus, the vstructure 502 created for class B has n entries 510, as shown. After the vstructure 502 is created, the structure creation instructions 420 update the pointer in the near object 404(1) to point to the newly created vstructure 502 instead of the shared vstructure 402. That way, the next time any of the virtual methods of class B is invoked, the JVM 104 will reference vstructure 502 instead of the shared vstructure 402. Furthermore, the structure creation instructions 420 store into each entry of the vstructure 502 a pointer or reference to the Java interpreter 220. Thereafter, the structure creation instructions 420 invoke the Java interpreter 220 to have the interpreter execute the first virtual method of class B. In this manner, a vstructure 502 is created, as needed, for class B at the time that a virtual method of class B is first invoked. Notice that this operation has no effect on the other data structures of FIG. 4. All of the other classes still reference the shared vstructure 402. Those other data structures will not change until the virtual methods of their associated classes are invoked.

Linking of Vstructures

As noted previously, one embodiment of the present invention enables vstructures to be linked to form a linked list of vstructures. Such a linked list enables all of the vstructures affected by a change to be easily identified and accessed. To illustrate how such a linked list may be formed in accordance with one embodiment of the present invention, reference will now be made to an example.

Suppose that, as in the previous example, a first virtual method of class B is invoked, and as a result of such invocation, the structure creation instructions 420 create a vstructure 502 for class B. However, suppose further that class B does not provide an implementation for this virtual method but rather relies on (and hence, inherits) the implementation provided by parent class A. In such a case, the structure creation instructions 420 still create the vstructure 502 for class B as described above, but in addition, it also performs some other operations.

Figure 6:
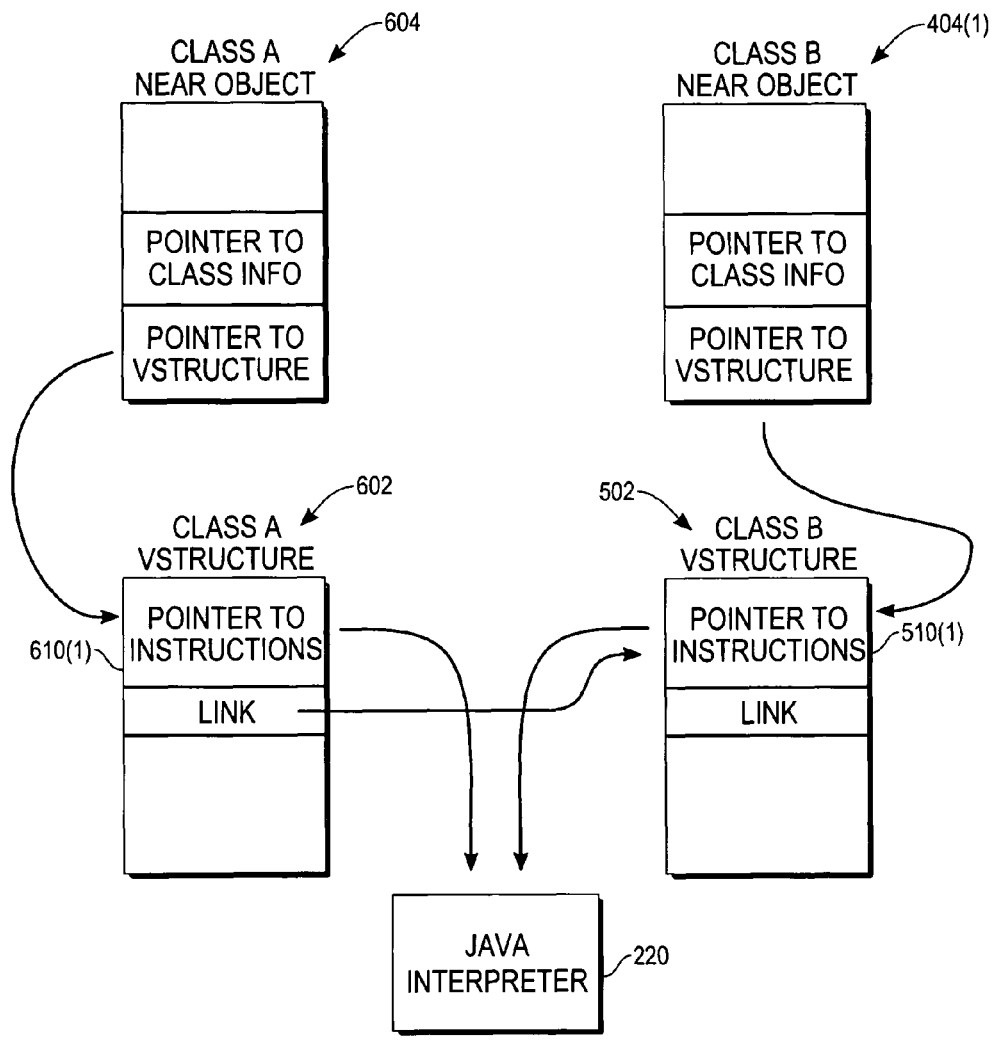
FIGS. 6 and 7 shows the manner in which a linked list of vstructures may be created, in accordance with one embodiment of the present invention.

In one embodiment, when the structure creation instructions 402 access the class information for class B, it determines whether class B provides an implementation for the first virtual method of class B. In this example, it does not; thus, the structure creation instructions 420 further determine, based upon the class information for class B, which class does provide the implementation for the first virtual method. In this example, that class is parent class A. Thus, in one embodiment, in addition to creating the vstructure 502 for class B, the structure creation instructions 420 also create a vstructure for class A (if it has not already been created). This is shown in FIG. 6, where the vstructure 602 for class A has been created, the pointer in the class A near object 604 has been updated to point to vstructure 602 instead of the shared vstructure 402, and the first entry 610(1) (and all of the other entries) of the vstructure 602 has been updated to point to the Java interpreter 220. In addition, the structure creation instructions 420 update a link in the first entry 610(1) of the class A vstructure 602 to point to the class B vstructure 502. This link indicates that, if entry 610(1) is updated at some later time, entry 510(1) of vstructure 502 should also be updated.

Figure 7:
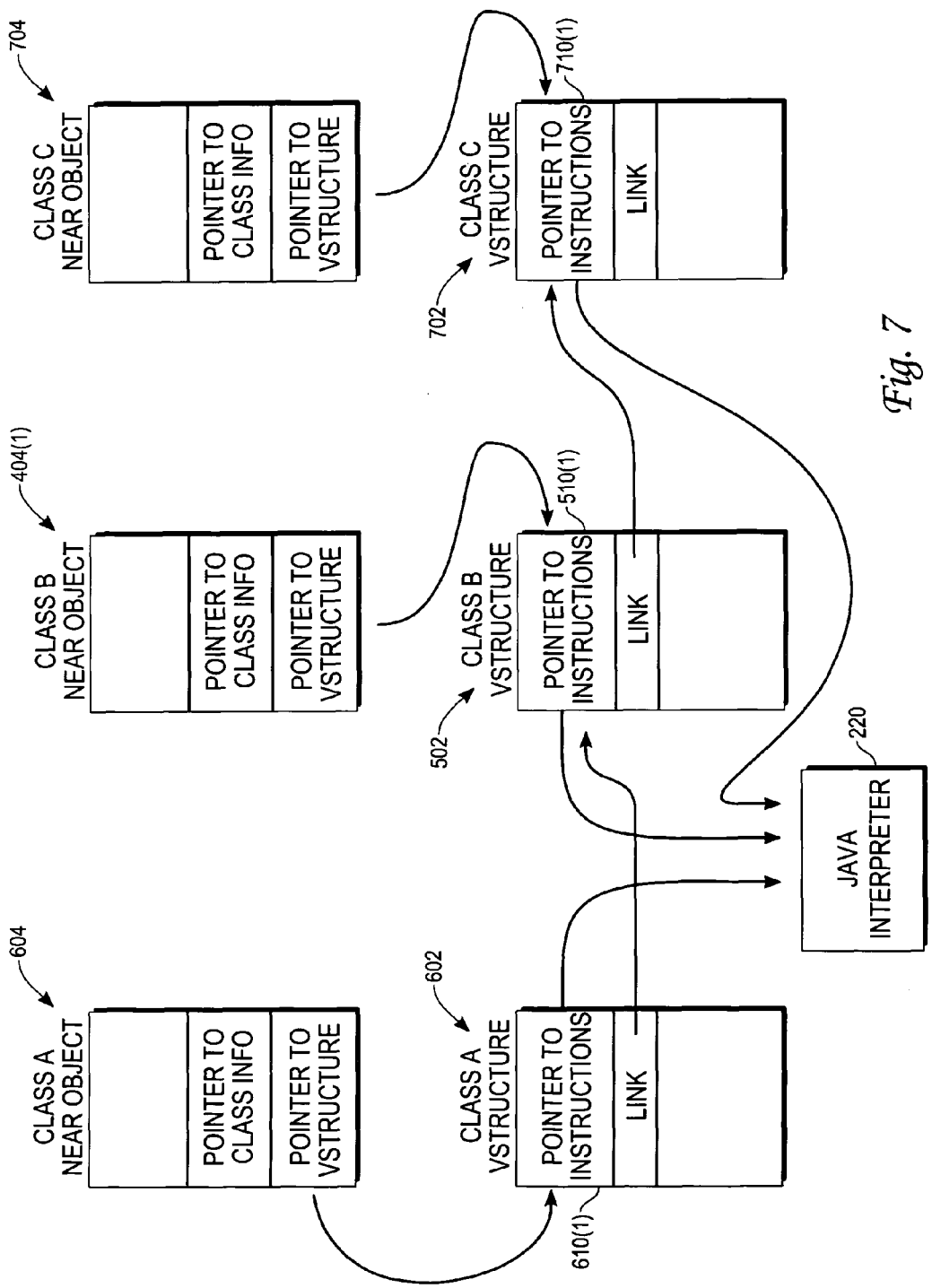

Suppose now that a class C, which is a subclass of class A, also relies on, and hence, inherits class A's implementation of the first virtual method. Suppose further that the first virtual method of class C is invoked for the first time. When this happens, assuming none of the other virtual methods of class C have been previously invoked, the structure creation instructions 420 will create a vstructure for class C. This is shown in FIG. 7, where the vstructure 702 for class C has been created, the pointer in the class C near object 704 has been updated to point to vstructure 702 instead of the shared vstructure 402, and the first entry 710(1) (and all of the other entries) of the vstructure 702 has been updated to point to the Java interpreter 220.

At the time the structure creation instructions 420 create the class C vstructure 702, it determines whether class C provides an implementation for the first virtual method of class C. In this example, it does not; thus, the structure creation instructions 420 further determine, based upon the class information for class C, which class does provide the implementation for the first virtual method. In this example, that class is parent class A. Thus, the structure creation instructions 420 check to see if the vstructure for class A has been created. In this example, it has; thus, the structure creation instructions 420 do not need to create it. The structure creation instructions 420 then check the link in the first entry 610(1) of the class A vstructure 602. In this example, that link points to class B's vstructure 502. Thus, the structure creation instructions 420 follow the link to vstructure 502, and check the link in the first entry 510(1) of that vstructure to see if it points to another vstructure. In this case, it does not; hence, the structure creation instructions 420 know that this is the end of the linked list. Accordingly, the structure creation instructions 420 update the link in entry 510(1) to point to class C's vstructure 702 to indicate that, if entry 610(1) is updated at some later time, entry 710(1) of vstructure 702 should also be updated. In this manner, a linked list of vstructures is created.

Updating of Vstructures

Figure 8:
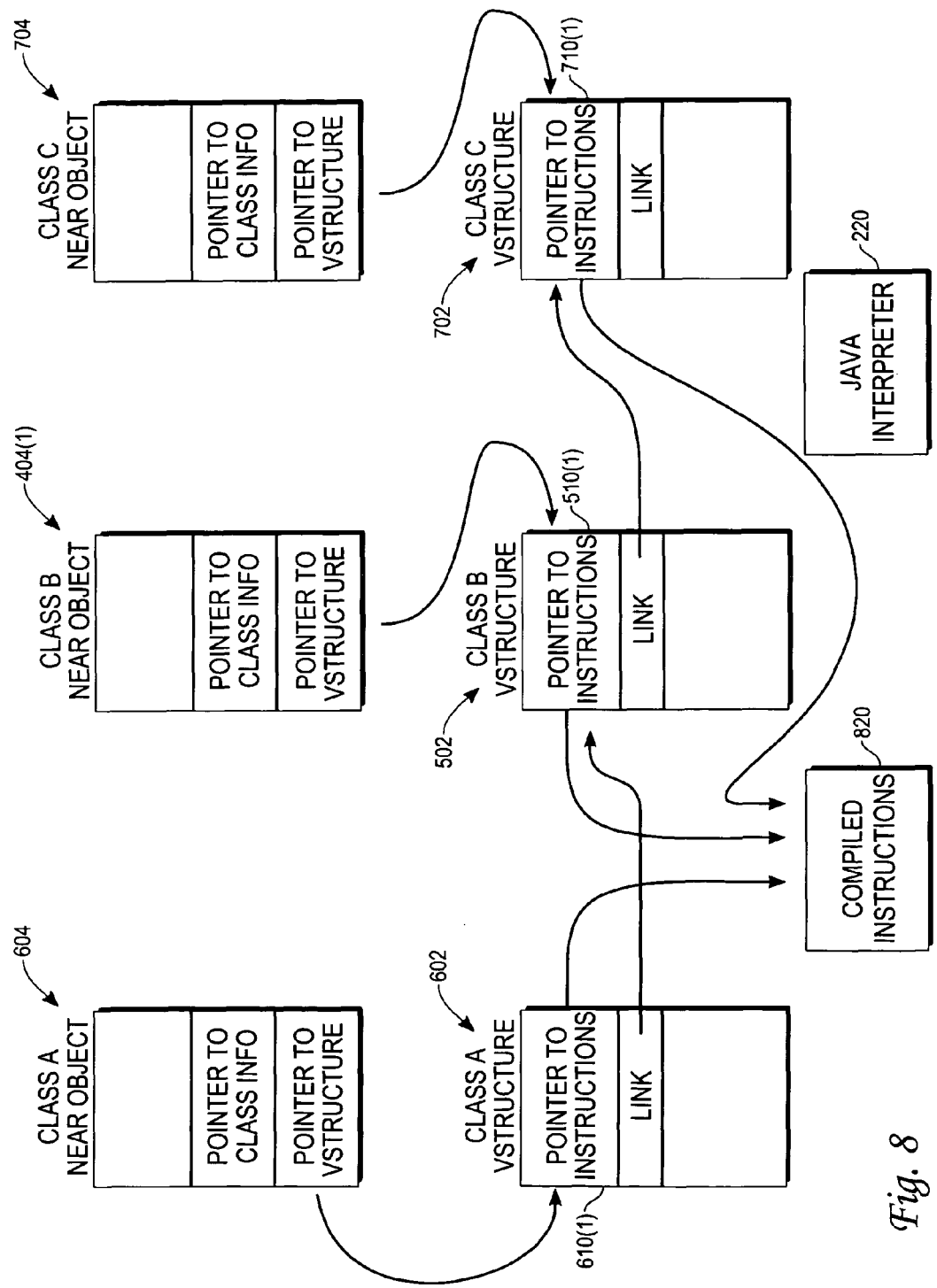
FIG. 8 shows how a linked list of vstructures may be used efficiently to make updates to a plurality of vstructures, in accordance with one embodiment of the present invention.

The linked list will be used when an affected entry of a vstructure is updated. To illustrate this update process, reference will be made to an example. Suppose that after several invocations of the first virtual method of class A, the JVM 104 decides to compile the virtual method. This compilation results in the creation of a set of compiled instructions 820 (see FIG. 8) for the virtual method. To get this set of compiled instructions 820 to be executed in response to an invocation of the virtual method, the JVM 104 has to update all of the vstructures that reference the virtual method to point to the set of compiled instructions 820 instead of the Java interpreter 220.

In one embodiment, the JVM 104 does so by accessing the near object of the class that provides the implementation for the virtual method. In this example, that class is class A and the near object is near object 604. Using the pointer in the near object 604 that points to the class A vstructure 602, the JVM 104 accesses the vstructure 602, and updates the first entry 610(1) (the entry that corresponds to the first virtual method) to point to the newly created compiled instructions 820. The JVM 104 then follows the link in entry 610(1) to the class B vstructure 502, and updates the first entry 510(1) in that vstructure 502 to point to the set of compiled instructions 820. Furthermore, the JVM 104 follows the link in entry 510(1) to the class C vstructure 702, and updates the first entry 710(1) in that vstructure 702 to point to the set of compiled instructions 820. At this point, since entry 710(1) has no link to a vstructure, the JVM 104 knows that it has reached the end of the linked list. Thus, it knows that all of the affected vstructures have been updated, and stops the update process. After this is done, all future invocations of the first virtual method of classes A, B, and C will result in the execution of the set of compiled instructions 820 instead of the Java interpreter 220.

Suppose now that after the set of compiled instructions 820 is created, the JVM 104 performs a garbage collection operation which causes the set of compiled instructions 820 to be moved to a new location. In such a case, the JVM 104 has to update all of the affected vstructures to cause them to point to the new location instead of the old location. To do so, the JVM 104 in one embodiment inspects some information associated with the set of compiled instructions 820. In one embodiment, this information comprises a pointer or reference to the near object of the class that implements the method. In the current example, that class is class A and the near object is near object 604. Once the near object is accessed, the updating of the vstructures 602, 503, 702 may be carried out in the same manner as that described above.

In the manner described, class-specific vstructures may be created on an as-needed basis, thereby significantly reducing the number of vstructures that are created during the execution of an application. Because of the smaller number of vstructures, and because of the linking of the vstructures, vstructures can be updated much more quickly and efficiently than before. This leads to overall improved performance.

Hardware Overview

Figure 9:
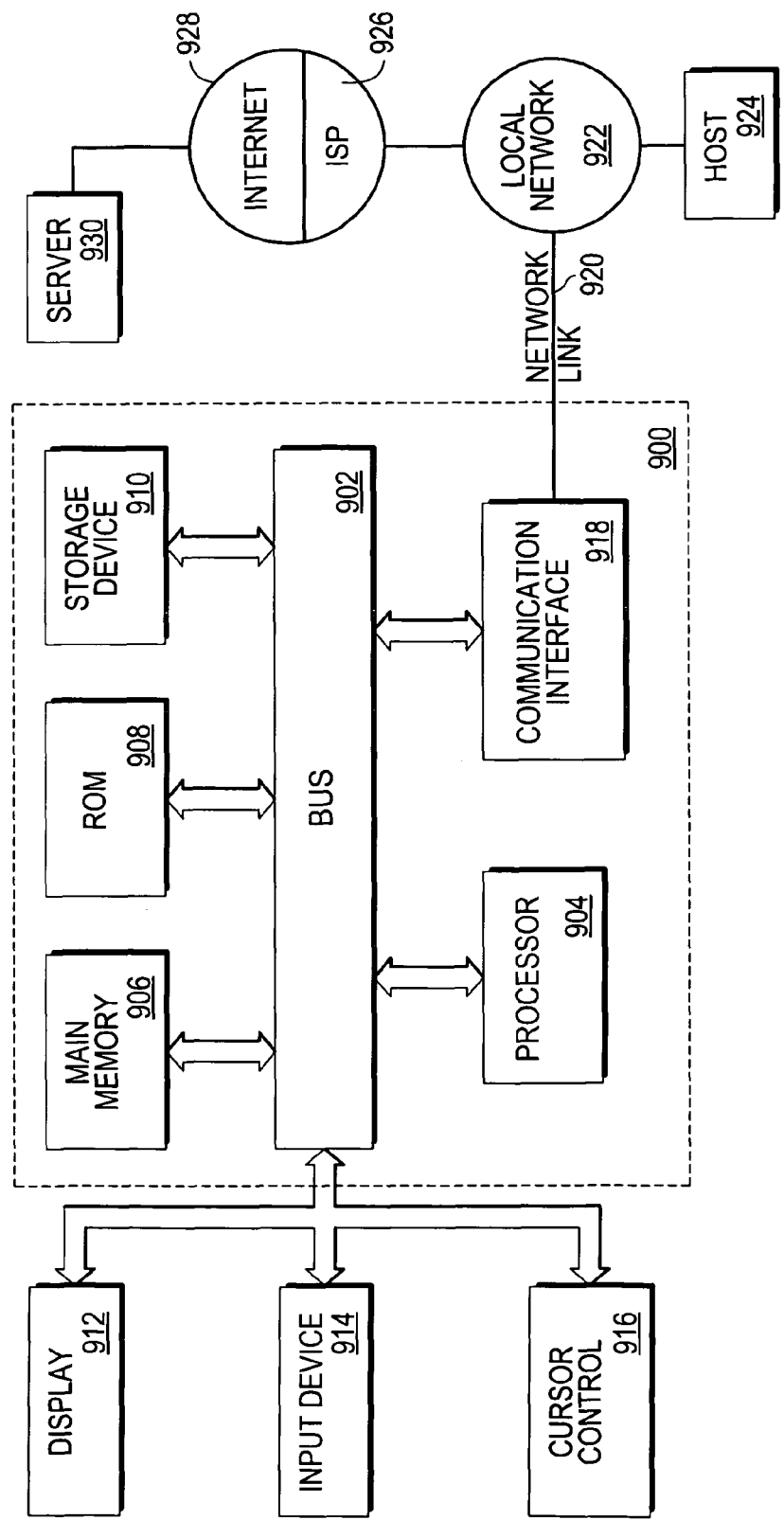
FIG. 9 is a block diagram of a general purpose computer system in which one embodiment of the present invention may be implemented.

In one embodiment, the operating system 102, JVM 104, and the application 106 take the form of sets of instructions that are executed by one or more processors. FIG. 9 is a block diagram of a computer system 900 upon which these sets of instructions may be executed. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912 for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may further be a network connection that connects one or more of the components. Any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operate in a specific fashion. In an embodiment implemented using computer system 900, various machine-readable media are involved, for example, in providing instructions to processor 904 for execution. Such a medium may take many forms, including non-volatile medium and volatile media. Non-volatile media includes, for example, optical or magnetic disks, such as storage device 910. Volatile media includes dynamic memory, such as main memory 906.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other medium from which a computer can read.

Various forms of machine-readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims and the equivalents thereof.

What is claimed is:

1. A machine implemented method, comprising:
   prior to detecting an invocation of a virtual method, initializing a plurality of object classes to reference a shared virtual method dispatch structure (vstructure), wherein an object class is one of the plurality of object classes, wherein the shared vstructure comprises a reference to a set of structure creation instructions;
   detecting the invocation of the virtual method of a plurality of virtual methods defined in the object class of the plurality of object classes; in response to detecting the invocation of the virtual method, creating a first vstructure for the object class,
   wherein the first vstructure comprises a plurality of entries,
   wherein the first vstructure comprises an entry of the plurality of entries for each of the plurality of virtual methods defined in the object class,
   wherein the first vstructure comprises a reference to a set of instructions that is to be executed when the virtual method is invoked,
   wherein creating the first vstructure comprises creating a link between a second vstructure and the first vstructure, wherein the second vstructure comprises a reference to the set of instructions, and
   wherein the set of instructions is located at a current location;
   relocating the set of instructions from the current location to a new location;
   updating the second vstructure to cause the second vstructure to reference the set of instructions at the new location instead of the current location;
   following the link between the second vstructure and the first vstructure to access the first vstructure; and
   updating the first vstructure to cause the first vstructure to reference the set of instructions at the new location instead of the current location.

2. The method of claim 1, wherein creating the first vstructure for the object class comprises:
   accessing the shared vstructure to obtain therefrom the reference to the set of structure creation instructions; and
   causing the set of structure creation instructions to be executed to create the first vstructure for the object class.

3. The method of claim 1, wherein creating the first vstructure further comprises:
   causing the object class to reference the first vstructure instead of the shared vstructure so that, in response to future invocation of any virtual method of the object class, the first vstructure is accessed instead of the shared vstructure.

4. The method of claim 3, further comprising:
   causing the set of instructions referenced by the first vstructure to be executed.

5. The method of claim 4, further comprising:
   detecting a second invocation of the virtual method of the object class;
   in response to detecting the second invocation of the virtual method, accessing the first vstructure to obtain therefrom the reference to the set of instructions; and
   causing the set of instructions to be executed.

6. The method of claim 1, wherein the virtual method comprises a set of source instructions, and wherein the method further comprises:
   compiling the set of source instructions to derive a set of compiled instructions;
   updating the second vstructure to cause the second vstructure to reference the set of compiled instructions instead of the set of instructions;
   following the link between the second vstructure and the first vstructure to access the first vstructure; and
   updating the first vstructure to cause the first vstructure to reference the set of compiled instructions instead of the set of instructions.

7. The method of claim 6, wherein the set of compiled instructions is currently located at a current location, and where the method further comprises:
   relocating the set of compiled instructions from the current location to a new location;
   updating the second vstructure to cause the second vstructure to reference the set of compiled instructions at the new location instead of the current location;
   following the link between the second vstructure and the first vstructure to access the first vstructure; and
   updating the first vstructure to cause the first vstructure to reference the set of compiled instructions at the new location instead of the current location.

8. A non transitory machine readable medium, comprising:
   instructions for causing one or more processors to initialize, prior to detecting an invocation of a virtual method, a plurality of object classes to reference a shared virtual method dispatch structure (vstructure), wherein an object class is one of a plurality of object classes, wherein the shared vstructure comprises a reference to a set of structure creation instructions;
   instructions for causing one or more processors to detect the invocation of the virtual method of the object class of the plurality of object classes;
   instructions for causing one or more processors to create, in response to detecting the invocation of the virtual method, a first vstructure for the object class,
   wherein the first vstructure comprises a plurality of entries, wherein the first vstructure comprises an entry of the plurality of entries for each of the plurality of virtual methods defined in the object class, wherein the first vstructure comprises a reference to a set of instructions that is to be executed when the virtual method is invoked, wherein creating the first vstructure comprises creating a link between a second vstructure and the first vstructure, wherein the second vstructure comprises a reference to the set of instructions, and wherein the set of instructions is located at a current location;

instructions for causing one or more processors to relocate the set of instructions from the current location to a new location;

instructions for causing one or more processors to update the second vstructure to cause the second vstructure to reference the set of instructions at the new location instead of the current location;

instructions for causing one or more processors to follow the link between the second vstructure and the first vstructure to access the first vstructure; and instructions for causing one or more processors to update the first vstructure to cause the first vstructure to reference the set of instructions at the new location instead of the current location.

9. The non transitory machine readable medium of claim 8, wherein the instructions for causing one or more processors to create the first vstructure for the object class comprises:

instructions for causing one or more processors to access the shared vstructure to obtain therefrom the reference to the set of structure creation instructions; and instructions for causing one or more processors to cause the set of structure creation instructions to be executed to create the first vstructure for the object class.

10. The non transitory machine readable medium of claim 8, wherein the instructions for causing one or more processors to create the first vstructure further comprises:

instructions for causing one or more processors to cause the object class to reference the first vstructure instead of the shared vstructure so that, in response to future invocation of any virtual method of the object class, the first vstructure is accessed instead of the shared vstructure.

11. The non transitory machine readable medium of claim 10, further comprising:

instructions for causing one or more processors to cause the set of instructions referenced by the first vstructure to be executed.

12. The non transitory machine readable medium of claim 11, further comprising:

instructions for causing one or more processors to detect a second invocation of the virtual method of the object class;

instructions for causing one or more processors to access, in response to detecting the second invocation of the virtual method, the first vstructure to obtain therefrom the reference to the set of instructions; and instructions for causing one or more processors to cause the set of instructions to be executed.

13. The non transitory machine readable medium of claim 8, wherein the virtual method comprises a set of source instructions, and wherein the machine readable medium further comprises:

instructions for causing one or more processors to compile the set of source instructions to derive a set of compiled instructions;

instructions for causing one or more processors to update the second vstructure to cause the second vstructure to reference the set of compiled instructions instead of the set of instructions;

instructions for causing one or more processors to follow the link between the second vstructure and the first vstructure to access the first vstructure; and instructions for causing one or more processors to update the first vstructure to cause the first vstructure to reference the set of compiled instructions instead of the set of instructions.

14. The non transitory machine readable medium of claim 13, wherein the set of compiled instructions is currently located at a current location, and where the machine readable medium further comprises:

instructions for causing one or more processors to relocate the set of compiled instructions from the current location to a new location;

instructions for causing one or more processors to update the second vstructure to cause the second vstructure to reference the set of compiled instructions at the new location instead of the current location;

instructions for causing one or more processors to follow the link between the second vstructure and the first vstructure to access the first vstructure; and instructions for causing one or more processors to update the first vstructure to cause the first vstructure to reference the set of compiled instructions at the new location instead of the current location.

* * * * *

UNITED STATES PATENT AND TRADEMARK OFFICE
CERTIFICATE OF CORRECTION

| | | |
|---|---|---|
| PATENT NO. | : 7,895,603 B1 | Page 1 of 1 |
| APPLICATION NO. | : 11/186137 | |
| DATED | : February 22, 2011 | |
| INVENTOR(S) | : Ioi K. Lam et al. | |

It is certified that error appears in the above-identified patent and that said Letters Patent is hereby corrected as shown below:

Title Page, Item (75) Inventors, "Loi" should be spelled as --Ioi--.

Signed and Sealed this
Twenty-sixth Day of April, 2011

David J. Kappos
*Director of the United States Patent and Trademark Office*